(12) United States Patent
Choi et al.

(10) Patent No.: US 12,212,978 B2
(45) Date of Patent: Jan. 28, 2025

(54) ELECTRONIC DEVICE AND BEAMFORMING CONTROL METHOD FOR ELECTRONIC DEVICE

(71) Applicant: Samsung Electronics Co., Ltd., Gyeonggi-do (KR)

(72) Inventors: Junsu Choi, Gyeonggi-do (KR); Hyunkee Min, Gyeonggi-do (KR); Chiho Kim, Gyeonggi-do (KR); Junghun Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 350 days.

(21) Appl. No.: 17/729,403

(22) Filed: Apr. 26, 2022

(65) Prior Publication Data

US 2022/0264322 A1    Aug. 18, 2022

Related U.S. Application Data

(63) Continuation of application No. PCT/KR2020/014725, filed on Oct. 27, 2020.

(30) Foreign Application Priority Data

Oct. 28, 2019    (KR) .................. 10-2019-0134571

(51) Int. Cl.
*H04W 16/28* (2009.01)
*H04B 7/06* (2006.01)

(52) U.S. Cl.
CPC .......... *H04W 16/28* (2013.01); *H04B 7/0617* (2013.01); *H04B 7/0695* (2013.01)

(58) Field of Classification Search
CPC ... H04W 16/28; H04B 7/0617; H04B 7/0695; H04B 7/0408; H04B 7/0417;

(Continued)

(56) References Cited

U.S. PATENT DOCUMENTS 9,306,648 B2    4/2016 Sagong et al.
9,735,940 B1 *   8/2017 Bakr ................. H04W 4/06
(Continued)

FOREIGN PATENT DOCUMENTS

KR    10-2015-0081610    7/2015
KR    10-2018-0096346    8/2018

OTHER PUBLICATIONS

PCT/ISA/210 Search Report issued on PCT/KR2020/014725, Feb. 18, 2021, pp. 5.

(Continued)

*Primary Examiner* — Luat Phung
(74) *Attorney, Agent, or Firm* — The Farrell Law Firm, P.C.

(57) ABSTRACT

Provided is an electronic device that includes a communication module, a memory, and a processor operatively connected to the communication module and the memory, which includes instructions that, when executed, cause the processor to perform beamforming training, control to transmit or receive through the communication module a radio signal for a radar function based on the beamforming training, to detect at least one object positioned based on the radio signal transmitted or received in the determined beam direction, to set at least one of the at least one object as a reference object, to periodically transmit or receive the radio signal in a direction of the reference object, to monitor a state of the reference object, based on the radio signal transmitted or received in the direction of the reference object, and to repeat the performing of the beamforming training, based on the monitoring result.

18 Claims, 14 Drawing Sheets

(58) Field of Classification Search
CPC ..... H04B 7/0619; G01S 5/011; G01S 5/0205; G01S 7/006; G01S 13/003; G01S 13/42; G01S 13/765
See application file for complete search history.

(56) References Cited

U.S. PATENT DOCUMENTS

| | | |
|---|---|---|
| 10,069,551 B2 | 9/2018 | Jo et al. |
| 10,879,980 B2 | 12/2020 | Jung et al. |
| 10,944,453 B2 | 3/2021 | Armand et al. |
| 2013/0083944 A1* | 4/2013 | Kvist ................. G10L 21/0216 381/92 |
| 2016/0377703 A1 | 12/2016 | Pais et al. |
| 2017/0155439 A1 | 6/2017 | Chang et al. |
| 2018/0331730 A1* | 11/2018 | Sanderovich ....... G01S 13/4463 |
| 2019/0123798 A1 | 4/2019 | Lou et al. |
| 2019/0253900 A1* | 8/2019 | Narasimha ............ H04W 4/025 |
| 2019/0289568 A1* | 9/2019 | Pajovic ............... H04W 64/003 |
| 2021/0028839 A1* | 1/2021 | Oteri .................... H04B 7/0617 |
| 2023/0388986 A1* | 11/2023 | Yang .................... H04L 5/0044 |

OTHER PUBLICATIONS

PCT/ISA/237 Written Opinion issued on PCT/KR2020/014725, Feb. 18, 2021, pp. 4.

\* cited by examiner

ELECTRONIC DEVICE AND BEAMFORMING CONTROL METHOD FOR ELECTRONIC DEVICE

CROSS-REFERENCE TO RELATED APPLICATION(S)

This application is a Continuation of PCT/2020/014725 filed on Oct. 27, 2020, and claims priority under 35 U.S.C. § 119 to Korean Patent Application No. 10-2019-0134571, filed in the Korean Intellectual Property Office on Oct. 28, 2019, the entire disclosure of each of which is incorporated herein by reference.

BACKGROUND

1. Field

The present disclosure relates generally to an electronic device and a method of controlling beamforming of the electronic device.

2. Description of the Related Art

An electronic device supporting an ultrahigh-speed communication technology for transmitting a larger amount of data within a short time is being developed. For example, communication technologies such as WiGig, IEEE 802.11ay, or fifth generation (5G) using an ultra-high frequency band (e.g., a millimeter wave) are being discussed.

A wireless a local area network (LAN) connects two or more devices using radio signal transmissions, e.g., based on the Institute of Electrical and Electronic Engineers (IEEE) 802.11. The IEEE 802.11 standard has been discussed to IEEE 802.11ax through IEEE 802.11b, IEEE 802.11a, IEEE 802.11g, IEEE 802.11n, and IEEE 802.11ac.

IEEE 802.11ad and 802.11ay systems may support ultrahigh speed communication in a broadband by using the frequency band of about 60 GHz, which is different from a conventional IEEE 802.11n or 802.11ac system employing the frequency band ranging from 2.4 GHz to 5 GHz. However, when a signal having a higher-frequency band is transmitted or received, signal attenuation is increased depending on a free space path loss (FSPL) model, as compared to when a signal having a lower-frequency band is transmitted or received. Accordingly, when a signal is transmitted or received between electronic devices, the technology of controlling beamforming becomes increasingly important.

SUMMARY

The disclosure has been made to address at least the above-mentioned problems and/or disadvantages and to provide at least the advantages described below.

An aspect of the present disclosure provides an electronic device capable of obtaining surrounding environment information by transmitting or receiving a radio signal, and of controlling beamforming (e.g., beamforming training) based on the obtained surrounding environment information, and a method for controlling the beamforming. Embodiments of the present disclosure provide an electronic device capable of performing periodic beamforming training and of adjusting a cycle of the beamforming training, and a method for controlling beamforming of the electronic device.

An aspect of the present disclosure provides an electronic device that includes a communication module, a memory, and a processor operatively connected to the communication module and the memory. The memory includes instructions that, when executed, cause the processor to perform beamforming training utilizing the communication module, control transmitting or receiving through the communication module a radio signal for a radar function in a beam direction determined based on the beamforming training; detect at least one object positioned in the beam direction, based on the radio signal transmitted or received in the determined beam direction; set at least one of the at least one object as a reference object; periodically transmit or receive through the communication module the radio signal in a direction of the reference object; monitor a state of the reference object, based on the radio signal transmitted or received in the direction of the reference object; and repeat the performing of the beamforming training, based on a result of the monitoring.

According to another aspect of the disclosure, a method for controlling beamforming of an electronic device is provided that includes performing beamforming training utilizing a communication module, transmitting or receiving a radio signal for a radar function in a beam direction determined based on the beamforming training; detecting at least one object positioned in the determined beam direction based on the radio signal transmitted or received; setting at least one of the at least one object as the reference object; periodically transmitting or receiving through the communication module the radio signal in a direction of the reference object; monitoring a state of the reference object, based on the radio signal transmitted or received in the direction of the reference object; and repeating the performing of the beamforming training based on a result of the monitoring.

Aspects of the present disclosure obtain environment information (e.g., the presence of the external object or the change in state of the external object) in the formed beam direction. According to aspects of the present disclosure, the external object may be detected in the beam direction formed based on the transmitted/received radio signal, and the beamforming may be controlled based on the change in state of the external object.

According to aspects of the present disclosure, the beamforming training may be triggered adaptively to the external environment or the beam may be formed based on the external environment in the beamforming training.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Hereinafter, various embodiments of the disclosure are described with reference to the accompanying drawings. However, it should be appreciated that embodiments and terms used therein are not intended to limit the technological features set forth herein to particular embodiments and include various changes, equivalents, or replacements for an embodiment of the disclosure.

With regard to description of drawings, the same or similar components will be marked by the same or similar reference signs.

Figure 1:
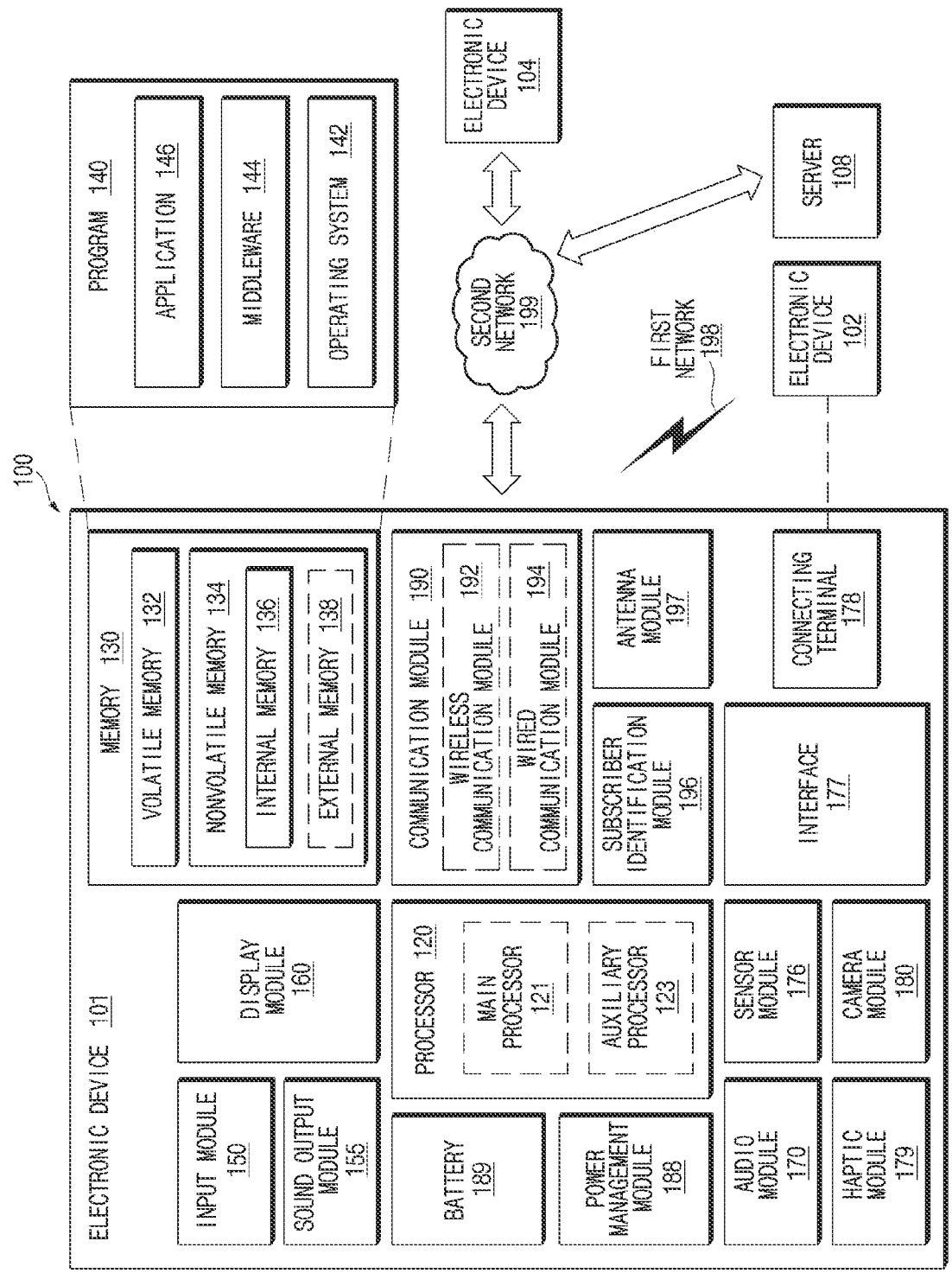
FIG. 1 illustrates an electronic device in a network environment according to an embodiment.

FIG. 1 illustrates an electronic device in a network environment according o an embodiment.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a LAN communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or IR data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
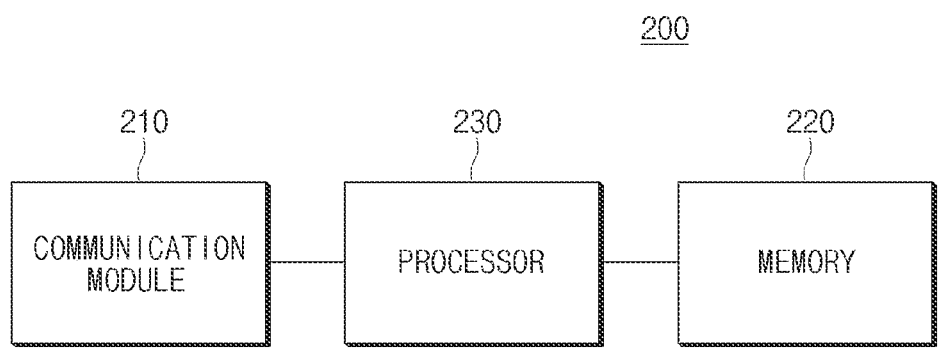
FIG. 2 illustrates an electronic device, according to an embodiment.

FIG. 2 illustrates an electronic device, according to an embodiment.

An electronic device 200 (e.g., the electronic device 101 of FIG. 1) includes a communication module 210 (e.g., the communication module 190 of FIG. 1), a memory 220 (e.g., the memory 130 of FIG. 1), and a processor 230 (e.g., the processor 120 of FIG. 1).

The communication module 210 may establish a communication channel between the electronic device 200 and an external electronic device (e.g., the electronic device 102 or 104 or the server 108 of FIG. 1), and may support wired communication or wireless communication through the established communication channel. The communication module 210 may support short-range wireless communication. For example, the communication module 210 may support Wi-Fi and Wi-Fi Direct. As another example, the communication module 210 may support IEEE 802.11ay. The communication module 210 includes at least one antenna element. The communication module 210 may form a beam corresponding to a communication path with an external device under the control of the processor 230. For example, the communication module 210 may perform beamforming under the control of the processor 230. The communication module 210 may perform beamforming (e.g., beamforming training) independently from the processor 230.

The communication module 210 may perform data communication through the short-range wireless communication with the external electronic device, under the control of the processor 230. The communication module 210 may transmit or receive a radio signal for a radar function in a specific direction (e.g., a beam direction formed based on the beamforming training), under the control of the processor 230. The communication module 210 may transmit the radio signal for the radar function independently from the processor 230, and may recognize a channel impulse response (CIR) based on the radio signal which is received after being reflected from an arbitrary object. The communication module 210 may transmit or receive a radio signal including at least a portion of a format of a PPDU of IEEE 802.11ay used for data communication. The communication module 210 may detect the external object based on the transmitted or received radio signal for the radar function, and may sense the change in state (the distance to the object, the direction of the object, or the motion of the object) of the object.

The communication module 210 includes at least a portion of the communication module 190 illustrated in FIG. 1.

The memory 220 may store at least one program, an application, data or instructions executed by the processor 230. The memory 220 includes at least a portion of the memory 130 illustrated in FIG. 1.

The processor 230 may perform beamforming training through the communication module 210. For example, the processor 230 may execute a beamforming training protocol of IEEE 802.11ay through the communication module 210. The processor 230 may form a beam in the direction of the external electronic device, which makes data communication, based on the beamforming training through the communication module 210. The processor 230 may periodically perform the beamforming training in a specific cycle, which is set through the communication module 210.

The processor 230 may transmit or receive a radio signal for a radar function in a beam direction determined based on the beamforming training, through the communication module 210. The electronic device 200 (e.g., the processor 230) may set all antennas, (e.g., an antenna array) which are included in the electronic device 200, to be in a transmit mode or a receive mode when the beamforming training is performed or data transmission is made with respect to the external electronic device. When the radar function is performed, some of the antennas (e.g., the antenna array) may be set to be in the transmit mode, or others of the antennas may be set to be in the receive mode. For example, the electronic device 200 (e.g., the processor 230) may transmit the radio signal and receive the reflected signal substantially in real time (that is, in the significantly short time), through an antenna set partially in the transmit or receive mode, when the radar function is performed. The processor 230 may detect an object by using a radio signal for the radar function transmitted or received through the communication module 210 or may perform a radar operation for monitoring the state of the object. The radar operation may be independently performed by the communication module 210. The transmitted or received radio signal for the radar function includes a Golay sequence. The radio signal for the radar function includes at least a portion of the PPDU transmitted or received when performing the beamforming training.

The processor 230 may detect at least one object positioned in a specific direction (e.g., a beam direction) based on the transmitted or received radio signal for the radar function. The processor 230 may recognize a state (e.g., the direction of the at least one object, the distance to the at least one object, the speed of travel of the at least one object, or the position of the at least one object, which is detected) of the at least one object detected based on the transmitted or received radio signal for the radar function. An operation of detecting the at least one object and an operation of recognizing the state of the at least one object may be performed independently by the communication module 210.

The processor 230 may set at least one of the at least one object which is detected, as a reference object. The processor 230 may set the most stationary object of the at least one object detected as the reference object. The processor 230 may set an object, which is positioned furthest away from the processor 230, of the at least one object detected as the reference object. The processor 230 may set the reference object based on the state (e.g., the distance, the speed, the movement, the position, or the mobility) of the at least one object detected or the combination thereof.

The processor 230 may periodically transmit or receive a radio signal for a radar function in the direction of the reference object through the communication module 210. For example, the processor 230 may periodically transmit the radio signal for the radar function in the direction of the reference object and may receive a radio signal reflected from the reference object. The radio signal includes at least a portion of transmitted or received signals (e.g., the PPDU of IEEE 802.11ay), when the beamforming training is performed. The direction of the reference object may be substantially the same as the beam direction determined based on the previous beamforming training.

The processor 230 may monitor the state (e.g., the direction of the reference object, the distance to the reference object, the speed of travel of the reference object, or the position of the reference object) of the reference object, based on the radio signal for the radar function transmitted and received in the direction of the reference object. The operation of monitoring the state of the reference object based on the radio signal for the radar function may be independently performed by the communication module 210.

The processor 230 may perform the beamforming training through the communication module 210, based on the monitoring result. For example, the processor 230 may instantly perform the beamforming training based on the monitoring result, may change the cycle of the beamforming training performed periodically or may control the operation of performing the beamforming training thereafter.

The processor 230 may trigger the operation of performing the beamforming training again, when the state (e.g., the direction, the speed, the position, or the distance) of the reference object is changed to at least a first preset threshold value. For example, in the case that the state of the reference object is not changed to at least the first threshold value, the reference object is not detected. The processor 230 may form a novel beam appropriate for the communication with the external electronic device by performing the beamforming training again through the communication module 210, when the state of the reference object is changed to at least the first preset threshold value.

The processor 230 may perform a control operation such that at least a partial operation of the beamforming training is not performed, when the state of the reference object is changed to less than one of the first preset threshold value and a second threshold value, when the beamforming training is repeatedly performed through the communication module 210. For example, the second threshold value may be less than the first threshold value. For example, the processor 230 may omit a sector sweep (SSW) and perform a beam refinement protocol (BRP) step of an SSW step and a BRP step which are based on the beamforming training protocol of IEEE 802.11ay, through the communication module 210.

The electronic device 200 may recognize the number of times in which an object other than the reference object is detected, through the radio signal for the radar function for a specified period. For example, the electronic device 200 may detect the number of times in which the radio signal for the radar function, which is periodically transmitted or received in the direction of the reference object for the specific period, is blocked by the object other than the reference object. The processor 230 may give priority to a direction except for the reference object, when the beam direction is determined in the operation of performing the beamforming training again, and when the number of times (e.g., the number of times in which the radio signal is blocked by the object other than the reference object), of detecting the object other than the reference object through the radio signal for the radar function periodically transmitted or received in the direction of the reference object for the specific period, is a third threshold value, which is preset, or more. For example, the processor 230 may give priority to the direction different from the beam direction which is previously determined, such that the beam is formed in the different direction, when the beamforming training is repeated through the communication module 210.

The processor 230 includes at least a portion of the processor 120 illustrated in FIG. 1. The operations performed by the communication module 210 and the processor 230 may be performed in connection to each other. Alternatively, the operation of the processor 230 may be performed independently from the communication module 210.

The electronic device 200 may include additional components of the electronic device 101 illustrated in FIG. 1.

Figure 3:
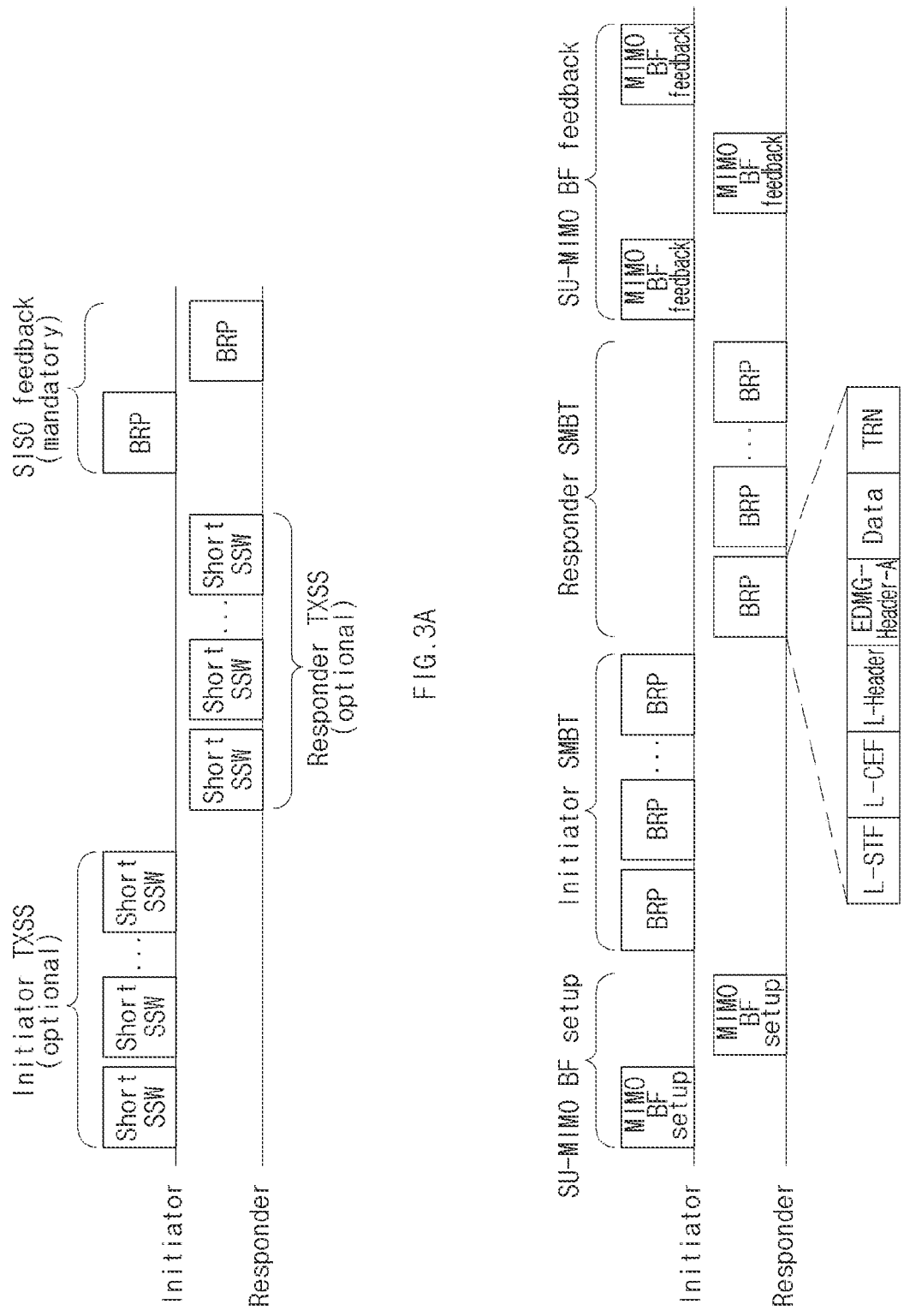
FIGS. 3A and 3B illustrate a beamforming training operation of an electronic device, according to an embodiment.

FIGS. 3A and 3B illustrate a beamforming training operation of an electronic device, according to an embodiment.

The electronic device (e.g., the electronic device 101 (e.g., the processor 120 or the communication module 190 of FIG. 1) or the electronic device 200 (e.g., the processor 230 or the communication module 210) of FIG. 2) may perform the beamforming training operation. For example, the electronic device may ensure an optimal link budget necessary for transmitting or receiving data by forming a beam appropriate for the external electronic device which is to transmit or receive data.

The electronic device may perform a beamforming training protocol defined in a WiFi communication standard (e.g., IEEE 802.11ay). For example, IEEE 802.11ay, which is an expansion version of IEEE 802.11ad, may support channel bonding and channel aggregation up to the maximum 8.64 GHz, and may employ multiple spatial streams. The electronic device may form the optimal beam allowing channel bonding, channel aggregation, or multiple spatial streams in an IEEE 802.11ay system.

The beamforming training operation includes an SSW step and a BRP step. For example, FIG. 3A illustrates an operation of an SSW step, and FIG. 3B illustrates an operation of a BRP step.

The electronic device may perform the SSW step before the BRP step. In the SSW step, the electronic device may transmit and receive SSW frames in various directions. For example, the electronic device (e.g., an initiator) may transmit an SSW frame by forming beams in various directions, or may receive an SSW frame transmitted by an external electronic device (e.g., a responder) in various directions. For example, the electronic device may form an approximate beam in a specific direction based on the SSW frame transmitted and received in the SSW step. For example, in the SSW step, a rough beam may be formed as the initiator and the responder exchange SSW frames.

The electronic device may transmit the BRP frame based on a beam forming result in the SSW step, or may receive the BRP frame transmitted by the external electronic device, in the BRP step. For example, the electronic device may form a finer beam based on the result in which the BRP frame is transmitted or received. For example, the electronic device may form a beam having the optimal link budget. For example, in the BRP step, a finer beam may be formed, as the initiator and the responder exchange the BRP frame.

For illustrative purposes, the example of beamforming training operation has been described based on an assumption that the electronic device forms a beam in a single-user multiple input and multiple output (SU-MIMO). However, various embodiments of the disclosure are not limited to the beamforming training operation for SU-MIMO.

Figure 4:
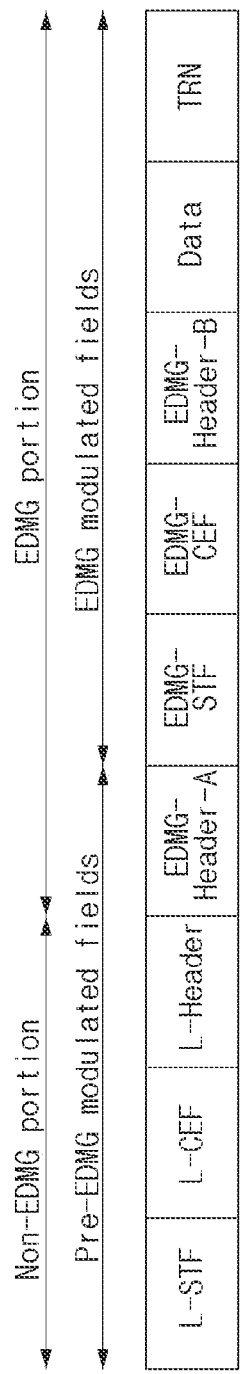
FIG. 4 illustrates a physical layer protocol data unit (PPDU) format, according to an embodiment.

FIG. 4 illustrates a PPDU format, according to an embodiment.

The electronic device (e.g., the electronic device 101 (e.g., the processor 120 or the communication module 190 of FIG. 1) or the electronic device 200 (e.g., the processor 230 or the communication module 210) of FIG. 2) may employ a PPDU format, when the operation of the beamforming training is performed. For example, the electronic device may transmit or receive a radio signal having the PPDU format. The electronic device may employ the PPDU format based on IEEE 802.11ay while performing the beamforming training operation, the data communication operation, or the radar operation.

The PPDU includes a legacy-short training field (L-STF), a legacy-channel estimation field (L-CEF), a legacy header (L-Header) field, an enhanced directional multi gigabit (EMDG)-Header-A field, an EDMG-STF field, an EDMG-CEF field, an EDMG-Header-B field, a data field, and a training field. For example, the PPDU may be divided into a non-EDMG portion including the L-STF field, the L-CEF field, and the L-header field, and an EDMG portion including the EDMG-Header-A field, the EDMG-STF field, the EDMG-CEF field, the EDMG-Header-B field, the data field, and the TRN field. For example, the PPDU format may be divided into a pre-EDMG modulated field including the L-STF field, the L-CE field, the L-header field, and the EDMG-Header-A field, and are EDMG modulated field including the EDMG-STF field, the EDMG-CEF field, the EDMG-Header-B field, the data field, and the TRN field.

A preamble portion (e.g., an STF field and a CEF field) of the PPDU may be used for detecting a packet, automatic gain control (AGC), frequency offset estimation, synchronization, modulation indication, or channel measurement. For example, the data field of the PPDU may be used to transmit a data payload of a user, and the TRN field may be used for beam refinement.

The CEF field includes a Golay sequence. When the electronic device transmits the Golay sequence through the CEF field, a responder may perform channel estimation necessary to normally receive a data symbol transmitted from the data field using the Golay sequence. For example, the responder may perform the channel estimation by using the auto correlation of the Golay sequence.

Figure 5A:
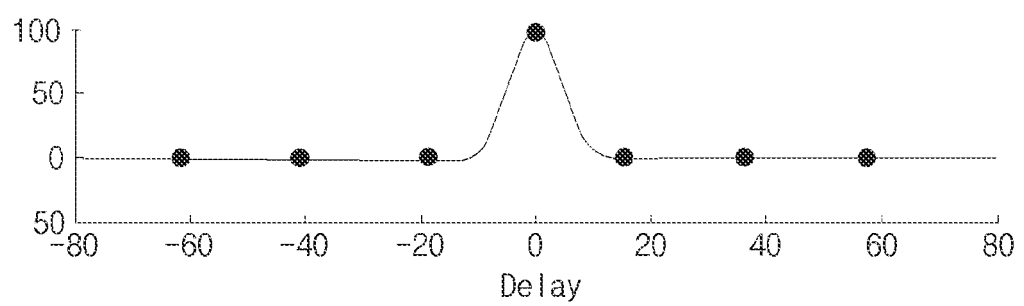
FIGS. 5A and 5B illustrate the characteristic of a Golay sequence, according to an embodiment.
Figure 5B:
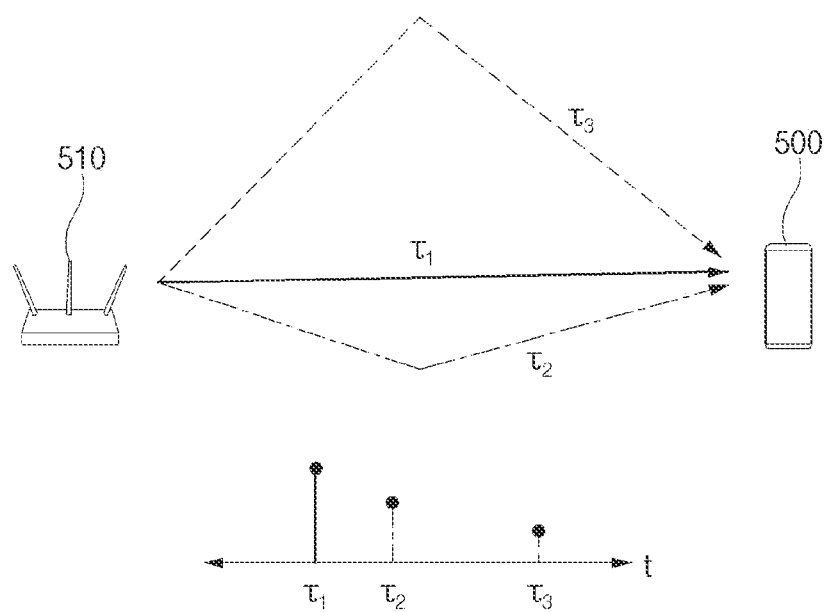

FIGS. 5A and 5B illustrate the auto correlation characteristic of a Golay sequence, according to an embodiment.

The electronic device 500 (e.g., the electronic device 101 (e.g., the processor 120 or the communication module 190 of FIG. 1) or the electronic device 200 (e.g., the processor 230 or the communication module 210) of FIG. 2) may transmit or receive a radio signal including a Golay sequence. For example, the electronic device 500 may transmit and receive a radio signal including the Golay sequence in the beam direction determined based on the beamforming training. The radio signal includes at least a portion of the PPDU of the IEEE 802.11ay system. For example, the radio signal includes a C-STF field and a C-CEF field of the PPDU format illustrated in FIG. 4. For example, at least one of the C-STF field and the C-CEF field includes the Golay sequence.

For example, the Golay sequence has an auto correlation characteristic appropriate to channel estimation. The auto correlation represents the sum of products of components mapped to the sequence of 'X' delayed by 'k' when it is assumed that 'X' is the sequence having the length of 'N'.

The auto correlation may be expressed as in the following Equation 1.

$$R_X(k) = \sum_{j=1}^{N-k} X_j X_{j+k} \quad (1)$$

FIG. 5A illustrates an auto correlation characteristic of a Golay sequence when k=1. The Golay sequence, which employs a complementary sequence pair, has a characteristic having a greater correlation value only when timing is exactly matched. For example, referring to FIG. 5A, the auto correlation value of the Golay sequence has a peak value only when the delay is zero (that is, when the specific timing is matched), and a remaining portion is convergent to '0'.

The electronic device 500 may correct a channel by using the auto correlation characteristic of the Golay sequence. For example, referring to FIG. 5B, it is assumed that channels between an initiator (e.g., the electronic device 500; a cellular terminal) and a responder (e.g., an external electronic device 510; an access point are established in the form of a plurality of paths having mutually different delays "τ1", "τ2", or "τ3". When the initiator transmits the Golay sequence, the responder may receive multi-path components having a plurality of delays, signal strengths, and phases. When the responder performs the auto correlation with respect to several delay values τ1, τ2, or τ3 for received signals, peak correlation values are made at time points corresponding to delay values τ1, τ2, or τ3 of multi-path components. For example, each peak includes information on signal attenuation and a phase of a relevant path component. The information may become channel information which is a CIR necessary for receiving data.

The electronic device 500 may form the optimal beam for data communication based on the delay, the signal strength, or the phase of each of the multi-path signal components by using the characteristic of the Golay sequence included in the radio signal transmitted or received together with the external electronic device 510.

Figure 5C:
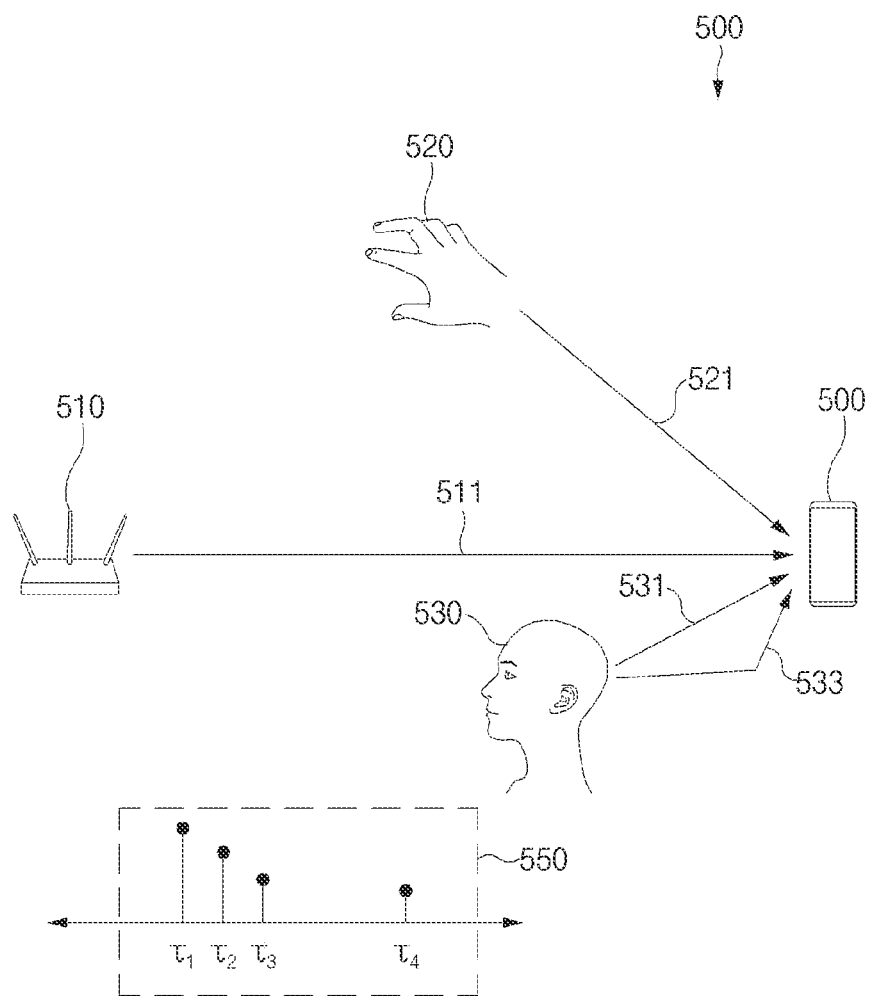
FIG. 5C illustrates an example of detecting an object based on a Golay sequence, according to an embodiment.

FIG. 5C illustrates an example of detecting an object based on a Golay sequence, according to an embodiment.

When the electronic device 500 transmits a Golay sequence, the Golay sequence may be reflected from a surrounding object 510, 520, or 530, and may be received to the electronic device 500 through a different channel path 511, 521, 531, or 533. For example, a signal reflected from one object 530 may be received to the electronic device 500 through a plurality of channel paths 531 or 533. The electronic device 500 may receive multiple path components having a plurality of delay times 550 (e.g., τ1, τ2, τ3, and τ4), signal strengths, and phases at time points at which an auto correlation value is a peak value, as the auto correlation for the Golay sequence is performed. For example, the number of paths recognized by the electronic device 500 may be varied depending on an application or a solution. Alternatively, the number of paths recognized by the electronic device 500 may be preset. For example, the electronic device 500 may perform the correlation of signals transmitted or received with respect to several delay times, and may obtain peak values at time points (e.g., τ1, τ2, τ3, or τ4) 550 identical to delay times of the multiple path components. For example, the electronic device 500 may obtain a signal attenuated and a phase shift value of a signal transmitted through each path at a time point showing a peak, based on a CIR. For example, the electronic device 500 may transmit a plurality of signals included in a radar frame, may measure a distance to a surrounding object based on CIR information obtained with respect to each signal, or may obtain a characteristic for recognizing the object.

An IEEE 802.11ad system or an IEEE 802.11ay system allows the CEF (e.g., the L-CEF or the EMG-CEF of FIG. 4) to include the Golay sequence such that the responder estimates a channel. Therefore, the electronic device 500 supporting the IEEE 802.11ad system or the IEEE 802.11ay system may transmit the PPDU (e.g., the PPDU of FIG. 4) including the Golay sequence. For example, the electronic device 500 may transmit the PPDU including only the STF and the CEF to reduce the overhead. For another example, the electronic device may transmit the PPDU including only the CEF. For example, the STF is a field necessary for the timing of the responder. In the case of the radar operation, because the initiator and the responder are the same device, the STF for the timing of the responder is not required.

Even when the PPDU (e.g., the PPDU of FIG. 4) is for general data transmission, the electronic device 500 may estimate a channel by including the Golay sequence into the CEF field. For example, when the electronic device 500 to implement the radar function using the signal of the IEEE 802.11ad system or the IEEE 802.11ay system may transmit the PPDU (e.g., the PPDU of FIG. 4) including the Golay sequence, and may receive a returning signal reflected from the subject object. For example, the electronic device 500 may estimate a CIR by using the Golay sequence and a correlation characteristic of the Golay pair. For example, the electronic device 500 may transmit the PPDU (e.g., the PPDU of FIG. 4) including the Golay sequence, may calculate the correlation between the signals received with respect to the several delay times of the transmitted Golay sequence, may obtain the peak correlation value at the time delay of each channel component which is received, and may obtain a signal strength and phase information of the relevant signal component at the relevant time delay, thereby estimating the CIR.

For example, when the correlation between a signal reflected and received from a specific object and a transmitted signal corresponds to a peak at the delay time of $\tau$, and when the speed of the electromagnetic wave is Vl, the traveling distance of the electromagnetic wave is 'Vl×$\tau$' until the signal transmitted from the electronic device 500 is reflected from the object and received. The traveling distance corresponds to the round-trip distance to the relevant object. Accordingly, the electronic device 101 may estimate that the object is at the distance of (Vl×$\tau$)/2. Through the above principle, the electronic device 500 using the wireless communication module for the IEEE 802.11ad system or the IEEE 802.11ay system may estimate the distance to the object by utilizing the Golay sequence.

When the electronic device 500 uses a plurality of antennas to transmit and/or receive a radio signal for a radar function, the electronic device 500 may additionally obtain the information on an angle of arrival (AoA) and the information on an angle of departure (AoD), as well as the time delay, the strength, or the phase of the signal reflected and received. The electronic device 500 transmits a radar signal several times, and, as time elapses, analyzes the information on the pattern or the phase when the reflected signal is received with respect to each transmitted signal, which is applied to recognizing a gesture or recognizing a face by using the characteristic of the reflected signal from the face, as well as a basic sensing function of estimating the distance, the direction, and/or the speed of travel of one or more surrounding objects. For example, the electronic device 500 may transmit a signal several times, and receive a reflected signal, thereby identifying a phase shift based on the fine movement of a living organism, and the phase shift may be utilized to the detection of the living organism (e.g., the state of being alive). For example, the electronic device 500 may distinguish between a living organism and an image of the living organism through the application to the detection of the living organisms, which cannot be performed through an imaging function of a camera.

Figure 6:
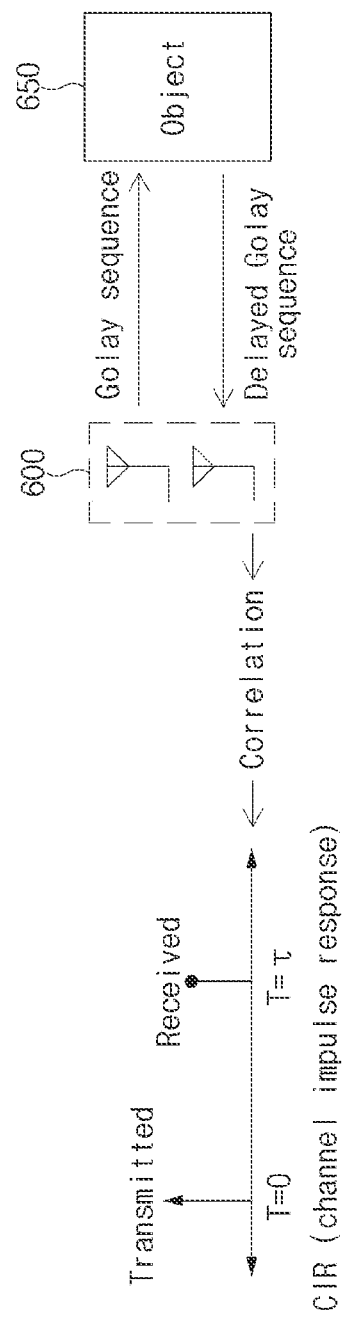
FIG. 6 illustrates the operation of an electronic device, according to an embodiment.

FIG. 6 illustrates the operation of an electronic device, according to an embodiment.

An electronic device 600 (e.g., the electronic device 101 (e.g., the processor 120 or the communication module 190 of FIG. 1) or the electronic device 200 (e.g., the processor 230 or the communication module 210) of FIG. 2) may transmit or receive a radio signal including a Golay sequence to detect an external object. The electronic device 600 may transmit the radio signal including the Golay sequence in a beam direction determined based on the beamforming training, and may receive a radio signal reflected from an external object 650. The electronic device 600 may perform the radar function by transmitting or receiving the radio signal. The electronic device 600 may perform the radar function by using the radio signal based on IEEE 802.11ay. For example, the electronic device 600 may transmit or receive a radio signal including at least a portion (e.g., the EDMG-STF and EDMG-CEF field) of a PPDU format defined based on IEEE 802.11ay. For example, the electronic device 600 may provide a radar function having higher precision by using a signal having a wider bandwidth based on IEEE 802.11ay. The electronic device 600 may perform a radar function or an operation, such as the recognition of the object (e.g., the face), the recognition of the gesture, or the proximity sensing by using the radio signal based on IEEE 802.11ay.

The electronic device 600 may detect an object, based on the transmitted or received radio signal for the radar function. For example, the electronic device 600 may detect an object by using at least a portion of a radio signal (e.g., the PPDU format of FIG. 4) used in data communication (e.g., data communication in the IEEE 802.11ay system) to perform the radar function. For example, the electronic device 600 may detect an object by using the radio signal having the PPDU format defined based on IEEE 802.11ay to perform the radar function. The electronic device 600 may transmit or receive the entire portion of the PPDU format or only at least a portion (e.g., the EMDG-STF field and the EDMG-CEF field) of the PPDU format. When the radio signal is transmitted or received to detect the object, the electronic device 600 may make a payload (e.g., data or a TRN field), which is transmitted or received, empty to reduce the overhead. The electronic device 600 may transmit arbitrary information for a specific function by loading the information into the payload of the transmitted PPDU format.

The electronic device 600 may transmit a radio signal using at least one antenna and may receive a radio signal reflected from the surrounding object 650. For example, the electronic device 600 may perform both functions of transmitting and receiving the radio signal by using at least one antenna to detect the object, which is different from when an external electronic device receives a radio signal transmitted by the electronic device 600 during the data transmission. The electronic device 600 may set all antennas (e.g., the antenna array), which are included in the electronic device 600, to be in a transmit mode or a receive mode, when the beamforming is performed or data transmission is made with respect to the external electronic device. When the radar function is performed, some antennas may be set to be in the transmit mode, or other antennas may be set to be in the receive mode. For example, the electronic device 600 may transmit the radio signal and receive the reflected signal in substantially real time through antennas set partially in the transmit or receive mode, when the radar function is performed.

For example, when an object is present in a direction in which the electronic device 600 transmits a radio signal, the electronic device 600 may receive a radio signal reflected from an arbitrary object. For example, the electronic device 600 may receive a radio signal reflected from the object and delayed. For example, when the electronic device 600 transmits a radio signal at T=0 seconds, the electronic device 600 may receive the radio signal from the object at T=$\tau$ seconds.

The electronic device 600 may transmit a radio signal including a Golay sequence in a specific direction (e.g., a beam direction determined based on beam training), and may receive a radio signal reflected from the arbitrary object from the specific direction. The electronic device 600 may obtain a CIR through the auto correlation between the Golay sequences included in the transmitted or received radio signal. For example, when the radio signal transmitted by the electronic device 600 is reflected from surrounding objects 650 and received, the electronic device 600 may perform the auto correlation of the Golay sequence with respect to several delays, thereby obtaining the peak, the strength of the radio signal at the relevant peak, and the information on the phase of the radio signal at a delay time of each component of the received radio signal.

For example, regarding the CIR obtained by the electronic device 600, when the delay time for the peak of the signal, which is reflected from the object and received, is τ, and the speed of the electromagnetic wave is $V_{light}$, the traveling distance of the radio signal becomes $V_{light} \times \tau$ until the radio signal transmitted by the electronic device 600 is reflected from the object and received. Because this distance corresponds to a round-trip distance of the radio signal to the object, the electronic device 600 may detect that the object is present on the distance of $(V_{light} \times \tau)/2$.

The electronic device 600 may perform a high-precision radar function using a radio signal of the IEEE 802.11ay system. For example, the electronic device 600 may detect an object present in a beam direction with high precision by using the radio signal of the IEEE 802.11ay system. For example, according to the theoretical duality relationship between a bandwidth and chip duration, the chip duration is inversely proportional to the bandwidth. For example, the IEEE 802.11ay system may use the bandwidth of several GHz for signal transmission, such that the chip duration may be less than nano-seconds depending on the duality relationship between the bandwidth and the chip duration. For example, when the electronic device 600 uses a radio signal of the IEEE 802.11ay system, the minimum detectable time resolution corresponds to a chip delay in calculating auto-correlation, and is multiplied by a speed of an electromagnetic wave to obtain the minimum detectable distance resolution. As described above, the chip duration is nano-seconds or less. Accordingly, the minimum distance resolution may be in a centi-meter level. The electronic device 600 may perform various functions (e.g., a radar function, an object detection function, a face recognition function, a gesture recognition function, or a proximity sensing function), as well as data communication by utilizing the 802.11ay system.

The electronic device 600 may detect an object (e.g., the external electronic device 650 or the wall), which is present in a specific direction (e.g., a beam direction determined based on beam training), based on the transmitted or received radio signal.

Figure 7:
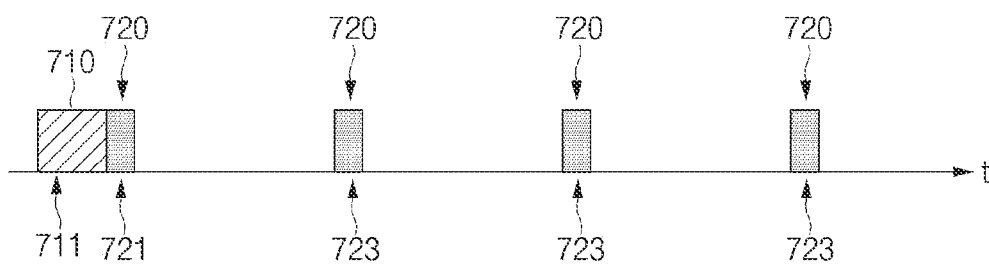
FIG. 7 illustrates a beamforming control operation of an electronic device, according to an embodiment.

FIG. 7 illustrates a beamforming control operation of an electronic device, according to an embodiment.

In operation 711, the electronic device (e.g., the electronic device 101 (e.g., the processor 120 or the communication module 190 of FIG. 1) or the electronic device 200 (e.g., the processor 230 or the communication module 210) of FIG. 2) may perform beamforming training. For example, the electronic device may perform a beamforming training protocol of IEEE 802.11ay. For example, the electronic device may transmit or receive a signal 710 for beamforming training to an external device, to perform the beamforming training. The electronic device may form a beam in the direction of an external electronic device, which makes data communication, through the beamforming training. The electronic device may perform the beamforming training periodically or when the signal strength is changed to a specific value or more.

In operations 721 and 723, the electronic device may perform a radar function. For example, the electronic device may transmit and receive a radio signal 720 for the radar function in a specific direction, and may perform a radar operation based on the transmitted and received radio signal 720 for the radar function. For example, the electronic device may periodically perform the radar operation in a specific cycle. The cycle for performing the radar operation may be preset or may be set or changed by a user. The cycle for performing the radar operation may be set to be shorter than the preset beamforming training cycle. The electronic device may transmit the radio signal 720 for the radar function in a specific direction (e.g., a beam direction determined based on beam training) and may receive a radio signal reflected from the arbitrary object. For example, the electronic device may transmit a radio signal (e.g., a signal format used for the beamforming training) used for the beamforming training operation or the data communication in a specific direction. The radio signal includes at least a portion of the PPDU format based on the IEEE 802.11ay. The electronic device may set all antennas (e.g., the antenna array), which are included in the electronic device, to be in a transmit mode or a receive mode, when the beamforming is performed (operation 711) or data transmission is made with the external electronic device. When the radar function is performed (operations 721 and 723), some of the antennas may be set to be in the transmit mode, or other antennas may be set to be in the receive mode. For example, the electronic device may transmit the radio signal and receive the reflected signal in substantially real time (that is, within the shorter period of time) through an antenna set to be in the transmit or receive mode, when the radar function is performed.

The electronic device may detect at least one object present in a specific direction, based on the transmitted or received radio signal 720 for the radar function. For example, the electronic device may detect a responder (e.g., an access point) present in the determined beam direction or a wall present on a communication path with the responder. The electronic device may recognize the state (e.g., the direction, the distance, the speed or the position of the at least one object detected) of the at least one object detected, based on the transmitted or received radio signal for the radar function.

The electronic device may determine, as a reference object, at least one of the at least one object detected in operation 721. For example, the electronic device may set the reference object in the initial radar operation after the beamforming training. The electronic device may set the most stationary object of the at least one object detected, as the reference object. For example, the electronic device may transmit the radio signal 720 for the radar function several times and receive the reflected signal, thereby setting, as the reference object, the most stable object of the detected objects, in operation 721.

The electronic device may set an object, which is positioned furthest away from the electronic device, of the at least one object detected, as the reference object. For example, when an object positioned closer to the electronic device is set as the reference object, even if the object slightly moves, the state of the object may be changed to a set threshold value or more. Accordingly, the electronic device may set the object, which is positioned farther away from the electronic device, as the reference object.

In operation 723, the electronic device may monitor the state of the reference object. For example, the electronic device may periodically transmit the radio signal 720 for the radar function in the direction of the reference object and may receive a radio signal reflected from the reference object. For example, the electronic device may recognize the change in the state (e.g., the direction, the distance, the speed or the position of the reference object) of the reference object, based on the transmitted or received radio signal 720 for the radar function. For example, the electronic device may determine the surrounding situation of the electronic device, based on the change in the state of the reference object.

The electronic device may perform the beamforming training based on the monitoring result. For example, the electronic device may instantly perform the beamforming training again based on the monitoring result, may change the cycle of the beamforming training performed periodically or may control the operation of performing the beamforming training thereafter. The electronic device may trigger the operation of performing the beamforming training again, when the state (e.g., the direction, the speed, the position, or the distance) of the reference object is changed to a first threshold value, which is preset, or more. For example, the case that the state of the reference object is changed to at least the first threshold value, includes the case that the reference object is not detected. For example, when the state (e.g., the direction) of the reference object is changed to a specific value or more, the beam formed based on the previous beamforming training may be a direction which is not appropriate to the data communication. For example, the electronic device may again perform, i.e., repeat the performing of, the beamforming training to form a novel beam appropriate to the communication with the external electronic device, when the state of the reference object is changed to at least the first preset threshold value, or when the reference object is not detected. The first threshold value may be preset or may be set or changed by a user.

For example, the electronic device may omit the SSW step and may perform the BRP step, when the state of the reference object is changed to less than a first preset threshold value, and to at least a second preset threshold value preset, and when the beamforming training is performed again. For example, the second threshold value may be set to be less than the first threshold value. The second threshold value may be preset or may be set or changed by a user.

For example, the electronic device may perform only some steps (e.g., the BRP step) in the beamforming training, when the state (e.g., the direction of an object) of the reference object is not significantly changed. For example, the electronic device may perform all of the steps for the beamforming training, when the direction of the beam, which is previously formed, is more remarkably offset from the direction of the external electronic device (the responder of communication). That is, when the state of the reference object is changed by an offset of at least the first threshold value or more. For example, the electronic device may perform at least some steps (e.g., the BRP step) for the beamforming training to finely adjust the beam when the direction of the beam, which is previously formed, is slightly offset from the direction of the external electronic device (the responder of communication). That is, when the state of a reference object is changed to less than at least one of the first threshold value and the second threshold value. For example, the electronic device may perform only a necessary step during the beamforming training, based on the change in the state of the reference object, thereby saving time and resources and more efficiently forming a novel beam.

The electronic device may instantly repeat the performing of the beamforming training by triggering the beamforming training, when the state of the basic object is changed to less than at least one of the first threshold value and the second threshold value. When the next beamforming training is performed based on a preset period, only some steps (e.g., the BRP step) may be performed.

The electronic device 200 may recognize the number of times of detecting an object other than a reference object, through the radio signal for the radar function, which is periodically transmitted or received in the direction of the reference object for a specified period. For example, when an obstacle is present between the electronic device and the reference object, the radio signal for the radar function may be blocked. For example, the electronic device may recognize the number of times of blocking the radio signal for the radar function by the object other than the reference object. The electronic device may give priority to a direction except for the direction of the reference object, when the beam direction is determined in the operation of performing the beamforming training again, and when the number of times (e.g., the number of times in which the radio signal is blocked by the object other than the reference object) of detecting the object other than the reference object, is at least a third preset threshold value, which may be set or changed by a user.

For example, when the transmitted radio signal for the radar function is blocked, the object (e.g., an obstacle) other than the reference object may be temporarily present or stationary in the direction of the reference object (that is, the previously formed beam direction). For example, the electronic device may determine that the obstacle has been temporarily present on a communication path (e.g., the determined beam direction) and may maintain a previously formed beam when the number of times (e.g., the number of times in which the radio signal is blocked by the object other than the reference object) of detecting the object other than the reference object is less than the third threshold value. For example, even if the obstacle (e.g., a passerby) is temporarily present in the beam direction formed between the electronic device (initiator) and the external electronic device (responder), and when the beam is formed again without a condition, the time for the beamforming training may be unnecessarily taken. To the contrary, the electronic device may form a beam in a direction different from a present direction by giving priority to a direction except for the present beam direction (e.g., the beam direction formed based on the previous beamforming training) in the beamforming training, when the number of times (e.g., the number of times in which the radio signal is blocked by the object other than the reference object), of detecting the object other than the reference object, is the third threshold value or more. For example, when only a link budget is considered, it is preferred that the direct communication path is formed between the electronic device (initiator) and the external electronic device (responder). However, when the obstacle is present between the electronic device and the external electronic device, the link budget may be instantaneously rapidly dropped, and the data communication may be intermittently disconnected. For example, when the obstacle is frequently present (e.g., when a human passes by the communication path between the electronic device and the external electrode device) and when a bypass communication path (e.g., a path of reflecting the signal from the wall and transmitting the signal) is set instead of a direct communication path between the electronic device and the external electronic device, the link budget provides improved results in terms of the quality of service (QoS), as a path robust against the change of the environment is formed. The electronic device may form a beam for providing more stable and improved consumer experience and QoS by giving the weight to a direction other than a present beam direction and performing beamforming in the operation of performing the beamforming training again, when the number of times (e.g., the number of times in which the radio signal for the radar function is blocked by the object other than the reference object), of detecting the object other than the reference object is at least the third preset threshold value.

Figure 8A:
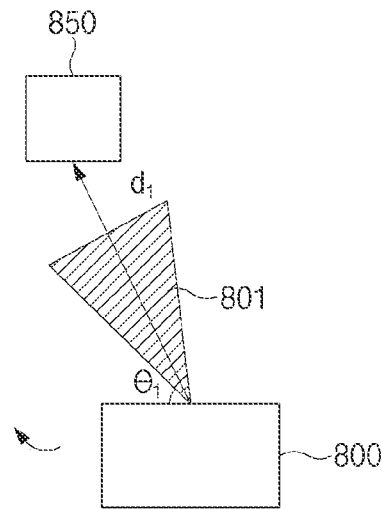
FIGS. 8A to 8C illustrate a beamforming control operation of an electronic device, according to an embodiment.
Figure 8B:
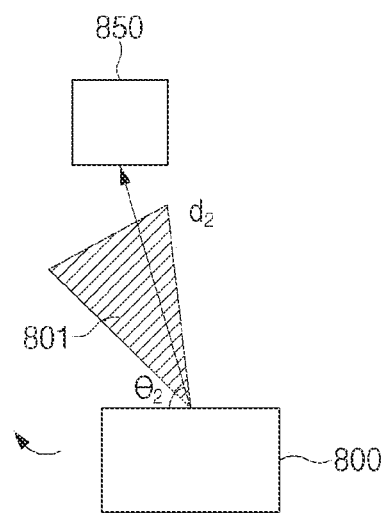
Figure 8C:
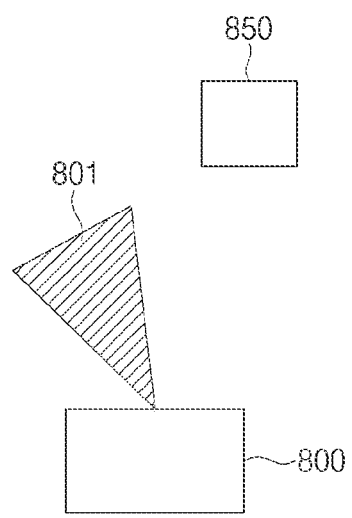

FIGS. 8A to 8C illustrate a beamforming control operation of an electronic device, according to an embodiment.

An electronic device 800 (e.g., the electronic device 101 (e.g., the processor 120 or the communication module 190 of FIG. 1) or the electronic device 200 (e.g., the processor 230 or the communication module 210) of FIG. 2) may form a beam based on the beamforming training. For example, the electronic device 800 may form a beam 801 in a direction of an external electronic device 850 (a communication counterpart). For example, the electronic device 800 may form the beam 801 in a specific direction appropriate to the communication with the external electronic device 850.

The electronic device 800 may transmit or receive a radio signal for a radar function, in a direction of the formed beam 801. For example, the electronic device 800 may transmit the radio signal for the radar function in the direction of the formed beam 801 and may receive a radio signal reflected from an arbitrary object. For example, the arbitrary object includes the external electronic device (a communication counterpart or an access point) or an object (e.g., a wall) present on a communication path formed with the external electronic device.

The electronic device 800 may detect at least one object based on the transmitted or received radio signal for the radar function, and may set at least one of the at least one object, which is detected, as a reference object 850. The electronic device 800 may monitor the state (e.g., the distance, the direction, the position or the speed) of the reference object 850.

The following description will be made with reference to FIGS. 8A to 8C on the assumption that the electronic device 800 recognizes the distance to the reference object 850 and the direction of the reference object 850, the disclosure is not limited thereto. For example, the electronic device 800 may monitor another state (e.g., the speed or the position) of the reference object 850.

For example, FIG. 8A illustrates that the electronic device 800 forms the initial beam 801, detects the reference object 850, and monitors the state of the reference object 850. For example, the electronic device 800 may recognize the distance 'd1' or the direction 'θ1' of the reference object 850 (FIG. 8B) and, the electronic device 800 may move. For example, referring to FIG. 8B, when the electronic device 800 moves, the distance 'd1' to the reference object 850 and the direction 'θ1' of the reference object 850 based on the electronic device 800 may be changed to the distance 'd2' to the reference object 850 and the direction 'θ2' of the reference object 850. For example, referring to FIGS. 8B and 8C, when the electronic device 800 moves, the direction of the beam 801, which is formed by the electronic device 800, may be offset from an existing communication path (that is, the direction 'θ1' of the reference object 850).

The electronic device 800 may repeat the performing of the beamforming training when the distance to the reference object 850 or the direction of the reference object 850 is changed to at least a preset threshold value.

For example, referring to FIG. 8B, the electronic device 800 may determine whether the state of the reference object 850 is changed to one of less than the first threshold value or more than the second threshold value. For example, referring to FIG. 8B, when the radio signal for the radar function is transmitted in the beam direction formed by the electronic device 800, the reference object 850 may be tracked. For example, the electronic device 800 may detect the change in the state (e.g., the distance to the reference object 850 or the direction of the reference object 850) of the reference object 850 through the radio signal for the radar function. When an object is detected to be present in a threshold range set for the reference object 850 (e.g., the distance to the reference object 850 or the direction of the reference object 850) recognized when the settings for the reference object 850 is made at the initial stage, the electronic device 800 may recognize the object as the reference object 850. For example, when an object is determined as being absent in a threshold range set for the reference object 850 recognized when the settings for the reference object 850 is made at the initial stage, the electronic device 800 may repeats the entirety of performing the beamforming training and may set a novel reference object.

When the state of the reference object 850 is changed to less than the first threshold value or more than the second threshold value, the electronic device 800 repeats the performing of the beamforming training. The first threshold value may be greater than the second threshold value. For example, when the change (θ2-θ1) of the reference object 850 is in the range of less than the first threshold value or more than the second threshold value, and when the beamforming training is performed again, at least some operations on the beamforming training protocol based on IEEE 802.11 may be omitted. The beamforming training protocol based on IEEE 802.11ay includes an SSW step and a BRP step. For example, the SSW step actually forms a beam in a specific direction and the BRP step more precisely forms a beam in the direction after performing the SSW step. The electronic device 800 may omit the SSW step and perform the BRP step when the change (θ2-θ1) in direction of the object is in the range of less than the first threshold value and more than the second threshold value. For example, the electronic device 800 may trigger or selectively perform single-user single output (SISO) beamforming training (e.g., the SSW step) or the MIMO beamforming training (e.g., the BRP step) of the beamforming training operations. When the change (θ2-θ1) in direction of the object is small, the direction of the beam 801 which is previously formed may not deviate significantly from a beam direction (e.g., the direction of the reference object 850) to be newly formed. For example, when the direction of a previously formed beam 801 does not deviate significantly from a beam direction to be newly formed, and when the beamforming is performed again, the SSW step is omitted and only the BRP step is performed, thereby saving time and the resources required for the beamforming training, such that the beam is more efficiently formed.

Referring to FIG. 8C, the electronic device 800 may determine whether the state of the reference object 850 is changed to at least the first threshold value. When the state of the reference object 850 is changed to at least the first threshold value, the electronic device 800 may repeat the performing of the beamforming training. For example, when the change in the direction of the reference object 850 is made to a greater extent (or is not detected), the direction of the beam 801 which is previously formed is determined to totally differ from the beam direction (the direction of the reference object 850) to be newly formed. For example, referring to FIG. 8C, when the electronic device 800 transmits the radio signal for the radar function in the direction of the beam 801, the reference object 850 may not be detected any more (that is, the reference object 850 is missing). For example, referring to FIG. 8C, the change in the state of the reference object may be infinite. When the state of the reference object 850 is changed to at least the first preset threshold value, the electronic device 800 may perform the beamforming training (e.g., the SSW step and the BRP step) and may form an appropriate beam. For example, the electronic device 800 may perform the beamforming training from the first SISO training step (that is the SSW step) of the beamforming training used for the SSW frame.

The electronic device 800 may perform the beamforming training, based on at least one of various states (e.g., the speed, the position, or the distance) of the reference object or the combination thereof. At least one threshold value may be set to be varied depending on the state (e.g., the speed, the position, the distance or the direction) of the reference object.

Figure 9A:
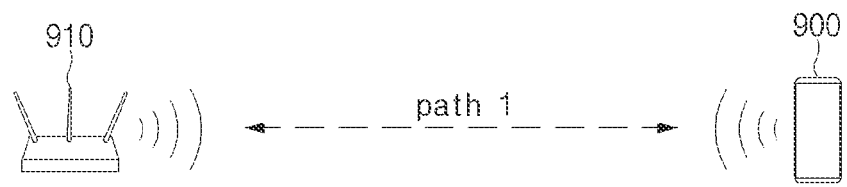
FIGS. 9A and 9B illustrate a beamforming control operation of an electronic device, according to an embodiment.
Figure 9B:
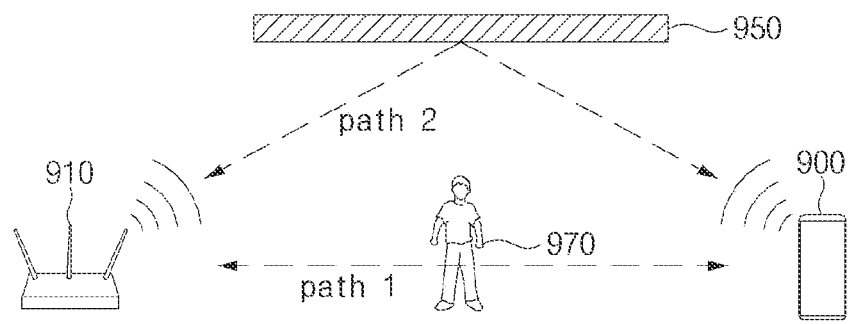

FIGS. 9A and 9B illustrate the beamforming control operation of an electronic device, according to an embodiment.

An electronic device 900 may perform beamforming training to form a beam through a communication path of an external electronic device 910. For example, the electronic device 900 may form a beam through the optimal communication path of communication paths with the external electronic device 910, based on a link budge. For example, referring to FIG. 9A, path 1, which is the direct path between the electronic device 900 and the external electronic device 910, may be the optimal communication path between the electronic device 900 and the external electronic device 910. The electronic device 900 may form the beam through the direct path (path 1) with the external electronic device 910 depending on the beamforming result.

The electronic device 900 may periodically transmit or receive a radio signal for a radar function in a direction of the formed beam. The electronic device 900 may detect at least one object based on the transmitted or received radio signal for the radar function. For example, the electronic device 900 may detect the external electronic device 910 or another object present between the electronic device 900 and the external electronic device 910. The electronic device may determine, as a reference object, at least one of the at least one object detected. For example, referring to FIG. 9A, the electronic device 900 may detect the external electronic device 910 based on the transmitted or received radio signal, and may set the external electronic device 910 as the reference object. In FIG. 9A, it is assumed that the electronic device 900 sets the external electronic device 910 as the reference object, but the disclosure is not limited thereto. The external electronic device 910 may set, as the reference object, another object (e.g., the wall) 950 around the electronic device 900 except for the external electronic device 910. For example, when the beam direction, which is previously formed by the electronic device 900, is the direction of the external electronic device 910, the electronic device 900 may set the external electronic device 910 as the reference object. When the beam direction, which is previously formed by the electronic device 900, is the direction of another object, instead of the direction of the external electronic device 910, the electronic device 900 may set, as the reference object, the another object instead of the external electronic device 910.

The electronic device 900 may periodically transmit or receive a radio signal for a radar function, in a direction of the reference object. For example, the direction of the reference object may be a beam direction which is previously formed. The electronic device 900 may sense the change in the state (e.g., the distance, the direction, and/or the speed) of the reference object by transmitting or receiving the radio signal for the radar function in the formed beam direction. The electronic device 900 may recognize the number of times of detecting an object other than the reference object, through the periodically transmitted or received radio signal for the radar function for a specified period. The electronic device 900 may recognize the number of times of detecting the object other than the reference object, through the radio signal for the radar function. The period of transmitting or receiving the radio signal may be set to be shorter than a specific period. For example, the electronic device 900 may set the period of transmitting or receiving the radio signal for the radar function to the period shorter than the cycle of the beamforming training, when periodically performing the beamforming training. Referring to FIG. 9A, the electronic device 900 may detect the number of times of blocking the radio signal for the radar function, which is transmitted or received through the existing communication path (path 1).

Referring to FIG. 9B, an obstacle 970 may be present on the existing communication path (path 1). When the obstacle 970 (e.g., a human being) frequently moves on the direct communication path (path 1) between the electronic device 900 and the external electronic device 910, the communication path (path 1) may be blocked and may be intermittently disconnected when the data is transmitted or received. When only the link budget is typically considered, the direct communication path (path 1) between the electronic device 900 and the external electronic device 910 may be best appropriate to communication. However, when the obstacle 970 frequently blocks the communication path, the QoS may be degraded. The electronic device 900 may determine the suitability for the present communication path (e.g., path 1) based on the number of times in which the radio signal periodically transmitted or received is blocked for a specific period.

The electronic device 900 may give priority to a direction other than the previously formed beam direction (e.g., the direction of path 1) in the next beamforming training, when the number of times (e.g., the number of times in which the radio signal for the radar function is blocked by an object other than the reference object), of detecting the object other than the reference object is at least a preset threshold value. When the electronic device 900 makes data communication based on a signal having a higher frequency band, the signal having the higher frequency band shows an inferior diffraction rate and an inferior transmission rate. Accordingly, when the obstacle 970 is present on the communication path, the link budget may instantaneously and rapidly drop. The electronic device 900 may form a beam in a direction other than an existing beam direction (e.g., the direction of path 1) by giving priority to a direction other than the previously formed beam direction (e.g., the direction of path 1), which causes the communication path to be frequently blocked due to the obstacle 970 in next beamforming training, when the number of times (e.g., the number of times in which the radio signal for the radar function is blocked by an object other than the reference object), of detecting the object other than the reference object is at least the preset threshold value. As illustrated in FIG. 9B, the electronic device 900 may form the beam in the direction of a communication path (path 2) allowing the electronic device 900 communicate with the external electronic device 910 through another object (e.g., a wall) 950 around the electronic device 900. For example, when the present communication path (path 1) is blocked to an extent of at least the threshold value due to the obstacle 970 for a specific period, the electronic device 900 may form the beam through the communication path (e.g., path 2) different from the present communication path in the next beamforming training.

The electronic device 900 may maintain a beam formed through an existing communication path, when another communication path for ensuring a sufficient link budget is not present except for the existing communication path. The electronic device 900 and the external electronic device 910 may communicate through another frequency band, by triggering a fast session transfer (FST) when the electronic device 900 and the external electronic device 910 support the FST.

The electronic device 900 may perform a control operation to form a beam through a communication path robust against the change of the environment, when performing beamforming training based on the surrounding environment (the state in which the communication path is blocked) recognized based on the radio signal as well as the link budget.

According to an embodiment of the disclosure, an electronic device includes a communication module, a memory, and a processor operatively connected to the communication module and the memory. The memory includes instructions that when executed cause the processor to perform beamforming training through the communication module, to transmit or receive a radio signal for a radar function based on the beamforming training through the communication module, control at least one of transmitting or receiving through the communication module a radio signal for a radar function in a beam direction determined based on the beamforming training, detect at least one object positioned in the determined beam direction, based on the radio signal transmitted or received in the determined beam direction, set at least one of the at least one object as a reference object, to periodically transmit or receive through the communication module the radio signal in a direction of the reference object, to monitor a state of the reference object, based on the radio signal transmitted or received in the direction of the reference object, and repeat the performing of the beamforming training through the communication module, based on a result of the monitoring.

According to an embodiment, the state of the reference object may include at least one of a direction of the reference object, a distance to the reference object, a speed of travel of the reference object or a position of the reference object, relative to the electronic device.

According to an embodiment, the radio signal may include a Golay sequence.

According to an embodiment, the radio signal may include at least a portion of a transmitted or received physical layer protocol data unit (PPDU), when performing the beamforming training.

According to an embodiment, the instructions cause the processor to trigger the repeated performing of the beamforming training, when the state of the reference object is changed to at least a preset first threshold value.

According to an embodiment, the beamforming training may include at least one of a sector sweep (SSW) step or a beam refinement protocol (BRP) step.

For example, the instructions may cause the processor to perform the BRP step without performing the SSW step, when the state of the reference object is changed to less than one of a first preset threshold value and a second preset threshold value, upon repeated performing of the beamforming training.

According to an embodiment, the instructions may cause the processor to recognize, during the transmitting or receiving of the radio signal for a specific period, a number of times in which an object other than the reference object is detected, and to give priority to the direction except for the direction of the reference object, when the number of times is at least a third threshold value, when the beam direction is determined in the repeated performing the beamforming training.

According to an embodiment, the instructions may cause the processor to set an object, which is positioned furthest away from the electronic device, of the at least one object detected, as the reference object.

According to an embodiment, the instructions may cause the processor to detect movement of each of the at least one object, and to set as the reference object the most stationary object of the at least one object detected.

According to an embodiment, the instructions may cause the processor to set a beamforming cycle based on a result of the monitoring.

Figure 10:
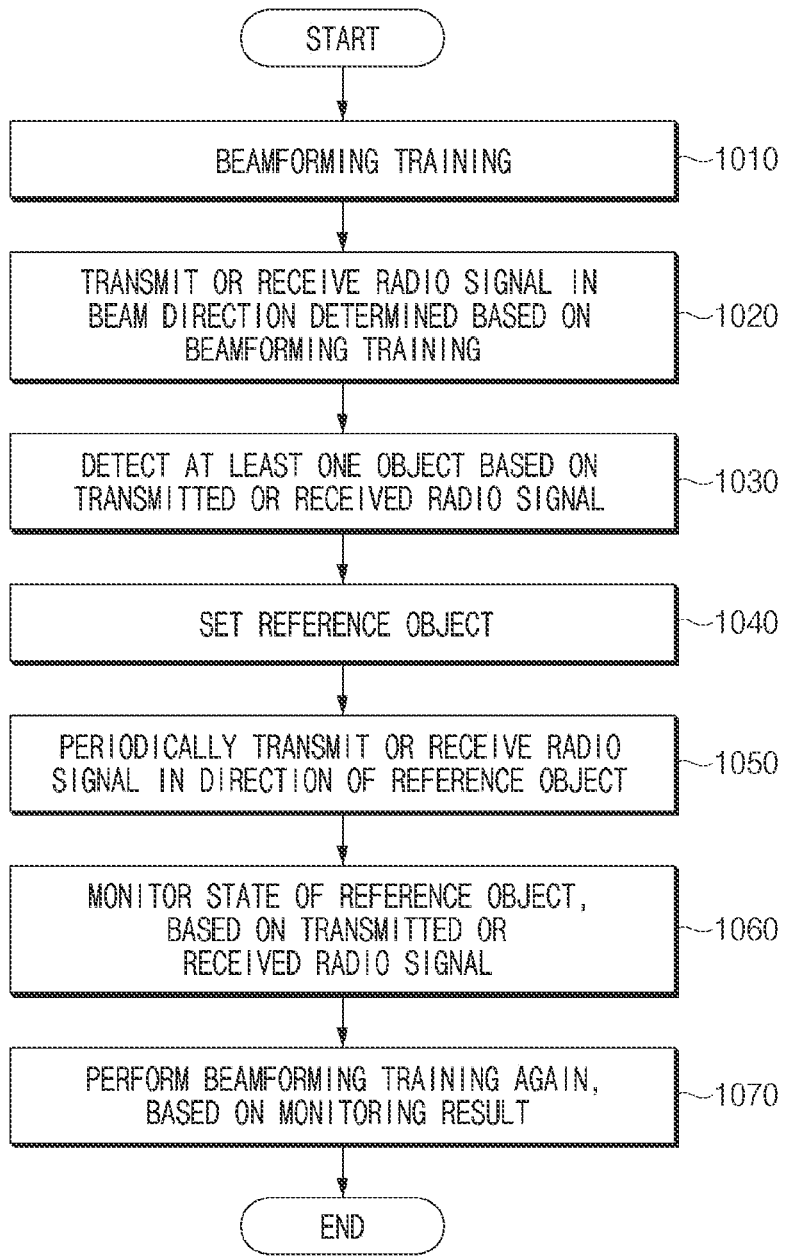
FIG. 10 is a flowchart illustrating a method for controlling beamforming of an electronic device, according to an embodiment.

FIG. 10 is a flowchart illustrating a method for controlling beamforming of an electronic device, according to an embodiment.

Referring to FIG. 10*t*, in operation 1010, the electronic device (e.g., the electronic device 101, 200, 300, 400, 500, 600, 700, 800, or 900 of FIGS. 1 to 9) performs beamforming training. For example, the electronic device may perform a beamforming training protocol of IEEE 802.11ay. The electronic device may form a beam in the direction of the external electronic device, which makes data communication, based on the beamforming training.

In operation 1020, the electronic device at least one of transmits or receives a radio signal for a radar function in a beam direction determined based on the beamforming training. The electronic device may detect an object by using the radio signal for the radar function or may perform the radar operation for monitoring the state of the object. The radio signal for the radar function, which is transmitted or received by the electronic device, includes a Golay sequence. The radio signal for the radar function, which is transmitted or received by the electronic device, includes at least a portion of a PPDU transmitted or received when the beamforming training is performed. For example, the electronic device may perform the radar operation by using a radio signal format used in an IEEE 802.11ay system.

In operation 1030, the electronic device detects at least one object positioned in a specific direction (e.g., the beam direction), based on the radio signal for the radar function, which is transmitted or received. For example, the electronic device may detect a responder (e.g., an access point) present in the beam direction or a wall present on a communication path with the responder. The electronic device may recognize the state (e.g., the direction, the distance, the speed, or the position of the at least one object detected) of the at least one object detected based on the transmitted or received radio signal for the radar function.

In operation 1040, the electronic device determines, as a reference object, at least one of the at least one object detected. The electronic device sets the most stationary object of the at least one object detected, as the reference object. The electronic device may set the most stationary object of the at least one object detected using a Doppler fast Fourier transform (FFT) as the reference object. The electronic device may set an object, which is positioned furthest away from the electronic device, of the at least one object detected, as the reference object. The electronic device may set the reference object, based on at least one of states (e.g., the distance, the speed, the movement, the position, or the mobility) of the object detected or the combination thereof.

In operation 1050, the electronic device periodically transmits or receives a radio signal for the radar function in the direction of the reference object. For example, the electronic device may perform a radar operation by using the radio signal for the radar function, which is transmitted or received periodically. For example, the electronic device may periodically transmit a radio signal for the radar function in the direction of the reference object and may receive a radio signal reflected from the reference object. In operation 1050, the radio signal may be the same as a radio signal in operation 1020. The direction of the reference object may be substantially the same as the beam direction determined based on the previous beamforming training.

In operation 1060, the electronic device may monitor the state (e.g., the direction of the reference object, the distance to the reference object, the speed of the reference object, or the position of the reference object) of the reference object, based on the radio signal for the radar function transmitted and received in the direction of the reference object. For example, the electronic device may recognize the change in state of the reference object. For example, the electronic device may determine the surrounding situation of the electronic device, based on the change in the state of the reference object.

The electronic device may recognize the number of times, in which an object other than a reference object is detected, through the radio signal which is periodically transmitted or received in the direction of the reference object for a specific period. For example, the electronic device may block the radio signal for the radar function and may recognize the number of times of blocking the radio signal for the radar function by an object other than the reference object, when an obstacle (e.g., the object other the reference object) is present on the communication path with the reference object.

In operation 1070, the electronic device repeats the performing of the beamforming training, based on a result of the monitoring. For example, the electronic device may instantly perform the beamforming training again based on the monitoring result, may change the cycle of the beamforming training or may control the operation of performing the beamforming training thereafter.

The electronic device may trigger the operation of performing the beamforming training again, when the state (e.g., the direction, the speed, the position, or the distance) of the reference object is changed to a first threshold value, which is preset, or more. For example, the case that the state of the reference object is changed to at least the preset threshold value, includes the case that the reference object is not detected. For example, the electronic device may perform the beamforming training again to form a novel beam appropriate to the communication with the external electronic device, when the state of the reference object is changed to the preset threshold value or more, or when the reference object is not detected.

The electronic device may perform a control operation such that at least a partial operation of the beamforming training is not performed, when the state of the reference object is changed to be less than the first threshold value, which is preset, and to the second threshold value or more, and when the beamforming training is performed again. For example, the first threshold value may be greater than the second threshold value. For example, the processor 230 may omit the SSW step and perform the BRP step of the SSW step and the BRP step of the beamforming training protocol based on IEEE 802.11ay. For example, the electronic device may omit the SSW step to determine a direction for forming a beam with respect to all directions when performing the beamforming training again, and perform only the BRP step, when the beam, which is previously formed, is not more offset from an appropriate direction (e.g., the direction of the reference object).

Figure 11:
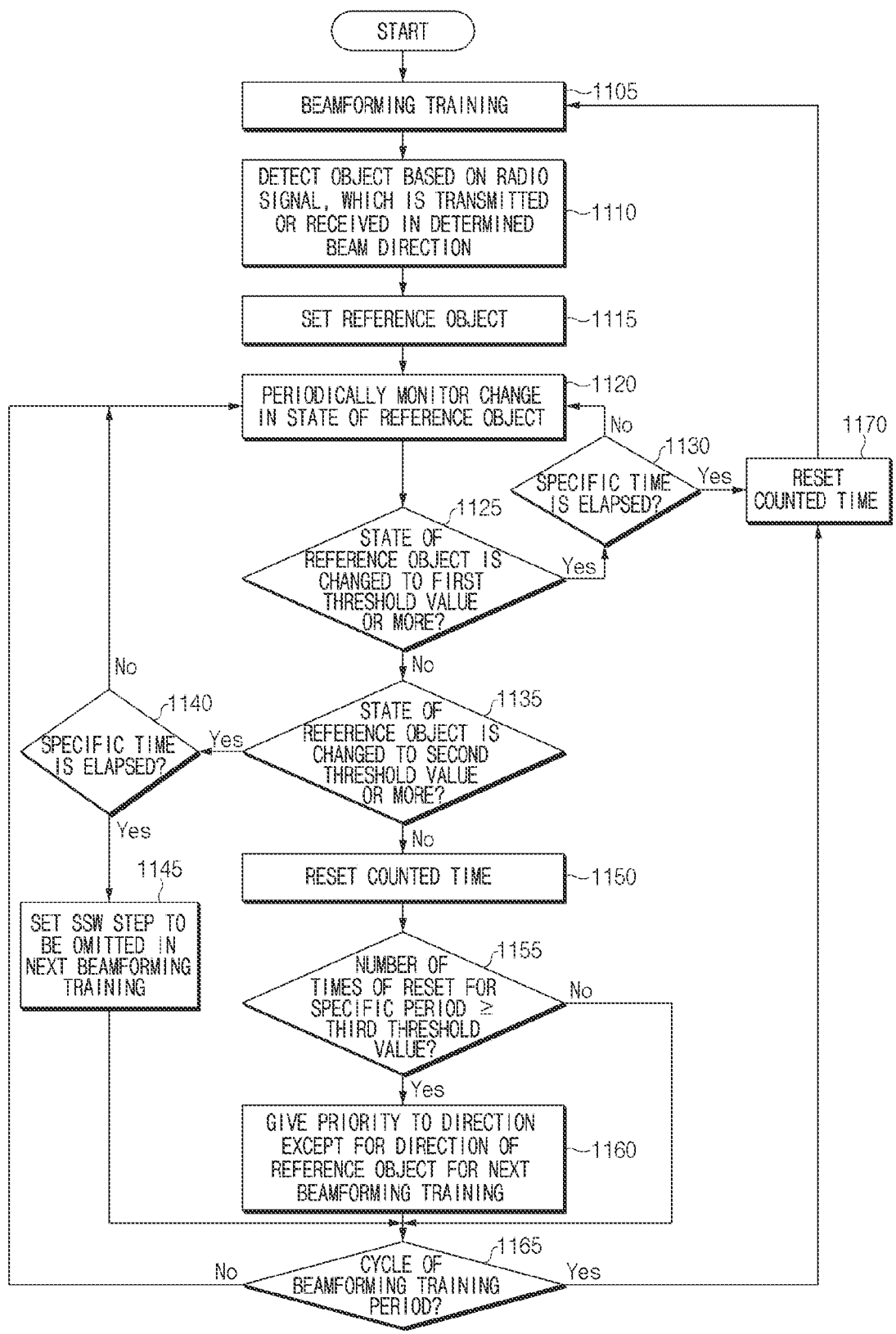
FIG. 11 is a flowchart illustrating a method for controlling beamforming of an electronic device, according to an embodiment.

FIG. 11 is a flowchart illustrating a method for controlling beamforming of an electronic device, according to an embodiment.

Referring to FIG. 11, in operation 1105, the electronic device (e.g., the electronic device 101, 200, 300, 400, 500, 600, 700, 800, or 900 of FIGS. 1 to 9) performs beamforming training. For example, the electronic device may perform a beamforming training protocol of IEEE 802.11ay. The electronic device may form a beam in the direction of the external electronic device, which makes data communication, based on the beamforming training. The electronic device may perform the beamforming training based on IEEE 802.11ay. The beamforming training includes the SSW step and the BRP step. The electronic device may perform the beamforming training in the set cycle of beamforming training.

In operation 1110, the electronic device detects at least one object based on the radio signal for the radar function, which is transmitted or received in the determined beam direction. For example, the electronic device may detect an object by using a radio signal or may perform the radar operation for monitoring the state of the object. The electronic device may recognize the state (e.g., the direction, the distance, the speed, or the position of the at least one object detected) of the at least one object detected based on the transmitted or received radio signal for the radar function.

In operation 1115, the electronic device determines, as a reference object, at least one of the at least one object detected. For example, the processor 230 may set the reference object, based on at least one of states (e.g., the distance, the speed, the movement, the position, or the mobility) of the object detected or the combination thereof.

In operation 1120, the electronic device periodically monitors the change in the state of the reference object. For example, the electronic device may periodically transmit a radio signal for the radar function in the direction of the reference object and may receive a radio signal reflected from the reference object. For example, the electronic device may recognize the change in the state of the reference object, based on the transmitted or received radio signal for the radar function.

In operation 1125, the electronic device determines whether the state of the reference object is changed to at least the first preset threshold value. The electronic device performs operation 1130 when the state of the basic object is changed to at least the first preset threshold value, and performs operation 1135 when the state of the basic object is not changed to at least the first preset threshold value.

In operation 1130, the electronic device determines whether a specific time is elapsed. For example, the electronic device may count a time from a time point in which the electronic device recognizes that the state of the reference object is changed to the first threshold value or more, and may determine whether the specific time is elapsed.

When the count of the time is started based on the change in the state of the basic object, the electronic device may determine whether the specific time is elapsed, while maintaining the count of the time, before resetting the counted time in operation 1150. The electronic device monitors the change in the state of the basic object in operation 1120, before resetting the counted time in operation 1150 or before the elapsed time is elapsed, when the time is counted to determine whether the specific time is elapsed. The specific time may be set to be shorter than the cycle of the beamforming training, and to be longer than the period of monitoring the reference object. For example, the specific time may be a time for continuously monitoring the state of the reference object to determine the case that the state of the reference object is temporarily changed.

The electronic device may perform the beamforming training again in operation 1105, when the specific time is elapsed. For example, the electronic device continuously monitors the state of the reference object and performs beamforming training in operation 1105, when the state of the basic object is not changed to less than one of the first threshold or second threshold. When the specific time elapses in operation 1130, the electronic device resets the counted time in operation 1170, and performs the beamforming training in operation 1105. The electronic device may reset the time, which is previously counted, before or after performing the beamforming training again in operation 1105. Although FIG. 11 illustrates that the counted time is reset before performing the beamforming again in operation 1170, the electronic device may reset the counted time when the beamforming training in operation 1105 is performed.

In operation 1135, the electronic device determines whether the state of the reference object is changed to at least the second preset threshold value. The electronic device performs operation 1140 when the state of the reference object is changed to less than the first threshold value and more than the second threshold value. The electronic device performs operation 1150 when the state of the reference object is not changed to more than the second threshold value.

In operation 1140, the electronic device determines whether the specific time is elapsed. For example, the electronic device may count a time from a time point in which the electronic device recognizes that the state of the reference object is changed to the second threshold value or more, and may determine whether the specific time is elapsed.

When the time count is started based on the change in the state of the reference object, the electronic device may determine whether a specific time is elapsed, while maintaining the count of the time, before resetting the counted time in operation 1150. When starting counting whether the specific time is elapsed (e.g., when the state of the reference object is changed to the first threshold value or more in operation 1125, or when the state of the reference object is changed to the second threshold value or more in operation 1135), the electronic device periodically monitors the change in the state of the reference object in operation 1120, before resetting the specific time in operation 1150, or before the specific time is elapsed. The specific time may be set shorter than or equal to the cycle of the beamforming training, and longer than the period of monitoring the reference object. For example, the specific time may be a time for continuously monitoring the state of the reference object to determine the case that the state of the reference object is temporarily changed.

The electronic device performs operation 1145 when the specific time is elapsed. In operation 1145, the electronic device may set the SSW step to be omitted in the next beamforming training. For example, the electronic device may omit the SSW step to determine a direction for forming a beam with respect to all directions when again performing the beamforming training, and perform only the BRP step, when the beam, which is previously formed, is not more offset from an appropriate direction (e.g., the direction of the reference object). The electronic device detects the period of next beamforming training in operation 1165 after omitting the SSW step when performing the next beamforming training in operation 1145, or may instantly perform the beamforming training in operation 1105 without waiting for the cycle of the beamforming training.

The electronic device resets the specific time in operation 1150. For example, the electronic device may reset the count after stopping the counting of the time for determining whether the specific time is elapsed. For example, the electronic device may reset the specific time and perform operation 1155, when the change in the state of the reference object is returned to the first threshold and/or the second threshold value or less in operations 1120 to 1135 before the specific time is elapsed. In operations 1125 and 1135, when the state of the reference object is changed to at least the first threshold value or less than the second threshold value, the electronic device will not perform counting of the time. The electronic device may omit operation 1150, when the counting of the time is not performed.

The electronic device determines whether the number of times of reset is equal to or greater than the third threshold value for a specific period in operation 1155. The specific period may be longer than the specific time, and may be shorter than or equal to the cycle of the beamforming training.

For example, the counting of the specific time may be reset a large number of times for the specific period, which refer to that the state of the reference object is returned to be changed to less than the first threshold value or less than the second threshold value, after the state of the reference object is changed to the first threshold value or more or the second threshold value or more, a large number of times. For example, the electronic device may periodically monitor the state (e.g., the position or the direction of the reference object) of the reference object to reset the specific time, when the state of the reference object is changed and returned to a state (or the state of the reference object is less than the second threshold value) similar to the initial state.

Another object other than the reference object may be detected when the radio signal for the radar function is transmitted or received to monitor the change in the state of the reference object. For example, when the another object is detected between the electronic device and the reference object, the communication path for the reference object may be blocked by the another object. In this case, as the another object is detected at a position different from a position of the reference object in the direction of the reference object, the electronic device may determine the state (e.g., the position) of the reference object as being changed to at least one of the first threshold or the second threshold. For example, when the another object blocks the radio signal for monitoring the reference object, the reference object may not be detected, and the electronic device may determine the state of the reference object as being significantly changed. For example, when the another object (e.g., the person), which is detected, is temporarily present and disappeared between the electronic device and the reference object, the state of the reference object is temporarily detected as being changed to the first threshold value or more, and the second threshold value or more, and then the state of the reference object may be detected as being similar to the initial state. For example, the number of times of resetting counting of the specific time may correspond to the number of times of temporarily blocking the communication path (or the radio signal for the radar function) for the reference object by the another object.

The electronic device performs operation 1160 when the number of times of resetting the count of the specific time is equal to or greater than the third threshold value or more, and performs operation 1165 when the number of times is less than the third threshold value, to repeat operations 1120 to 1150 until the cycle of the beamforming training comes.

In operation 1160, the electronic device gives priority to the direction except for the direction of the reference object with respect to the next beamforming training. For example, the electronic device may give the priority to the direction except for the beam direction which is currently formed, when the beamforming training is performed again.

In operation 1165, the electronic device detects the cycle of the beamforming training. The electronic device may perform the beamforming training in operation 1105 when the cycle of the beamforming training comes. For example, the electronic device may set the SSW step to be omitted in operation 1115, or may perform the beamforming training by repeating operation 1145 or operation 1160, when the priority is given to the direction except for the reference object direction which is currently set in operation 1160. For example, when repeating the performing of the beamforming training, the electronic device may omit some steps (e.g., the SSW step), or may form a beam through a communication path (direction) stabler than the present beam direction, based on the priority of the direction. For example, the electronic device may reduce the time or the resource consumed in the beamforming training, by omitting some steps when performing the beamforming training again. For example, the electronic device may provide a stabler communication situation and higher QoS, by forming a beam, by preferentially considering a direction other than a communication path (direction) unstable due to the obstacle, when the beamforming training is performed again. The electronic device may periodically monitor the state of the reference object in operation 1120, when the cycle of the beamforming training does not come.

According to an embodiment of the disclosure, a method for controlling beamforming of an electronic device (e.g., the electronic device 101, 200, 300, 400, 500, 600, 700, 800, or 900 of FIGS. 1 to 9) is provided, which includes performing beamforming training through a communication module, at least one of transmitting or receiving through the communication module a radio signal for a radar function in a beam direction determined based on the beamforming training, detecting at least one object positioned in the beam direction in the determined beam direction based on the radio signal transmitted or received, setting at least one of the at least one object as a reference object, periodically transmitting or receiving through the communication module the radio signal in a direction of the reference object, monitoring a state of the reference object, based on the radio signal transmitted or received in the direction of the reference object, and repeating the performing of the beamforming training, based on a result of the monitoring.

According to an embodiment, the state of the reference object may include at least one of a direction of the reference object, a distance to the reference object, a speed of travel of the reference object a the position of the reference object, relative to the electronic device.

According to an embodiment, the radio signal may include a Golay sequence.

According to an embodiment, the radio signal may include at least a portion of a transmitted or received physical layer protocol data unit (PPDU) when performing the beamforming training.

According to an embodiment, the repeating the performing of the beamforming training may include triggering the repeated performing the beamforming training again, when the state (e.g., the direction, the speed, the position, or the distance) of the reference object is changed to at least a first preset threshold value.

According to an embodiment, the beamforming training may include at least one of a sector sweep (SSW) step or a beam refinement protocol (BRP) step.

For example, the repeating the performing of the beamforming may include performing the BRP step without performing the SSW step, when the state of the reference object is changed to less than one of a first preset threshold value and a second preset threshold value, during repeated performing of the beamforming training.

According to an embodiment, the method may further include recognizing a number of times in which an object other than a reference object is detected, during periodically transmitting or receiving the radio signal for the radar function for a specific period in the direction of the reference object.

According to an embodiment, the performing of the beamforming training again may include giving priority to the direction except for the direction of the reference object, when the number of times is at least the third threshold value.

According to an embodiment, the setting of the reference object may include setting an object, which is positioned furthest away from the electronic device, of the at least one object detected, as the reference object, or setting the most stationary object of the at least one object detected, as the reference object.

According to an embodiment, the repeated performing of the beamforming training may include setting a cycle of beamforming training based on a result of the monitoring.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases.

As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed:

1. An electronic device, comprising:
a communication module;
a memory; and
a processor operatively connected to the communication module and the memory,
wherein the memory includes instructions that, when executed, cause the processor to:
perform beamforming training utilizing the communication module;
control transmitting or receiving through the communication module a radio signal for a radar function in a beam direction determined based on the beamforming training;
detect at least one object positioned in the beam direction, based on the radio signal transmitted or received in the determined beam direction;
set the at least one object as a reference object;
periodically transmit or receive through the communication module the radio signal in a direction of the reference object;
monitor a state of the reference object, based on the radio signal transmitted or received in the direction of the reference object; and
repeat the performing of the beamforming training, based on a result of the monitoring,
wherein the instructions cause the processor to:
recognize, during the transmitting or receiving of the radio signal for a specific period, a number of times in which an object other than the reference object is detected, and
give priority to a direction except for the direction of the reference object, when the number of times is at least a third threshold value, when the beam direction is determined in the repeated performing of the beamforming training.

2. The electronic device of claim 1, wherein the state of the reference object includes at least one of a direction of the reference object, a distance to the reference object, a speed of travel of the reference object, or a position of the reference object, relative to the electronic device.

3. The electronic device of claim 1, wherein the radio signal includes a Golay sequence.

4. The electronic device of claim 1, wherein the radio signal includes at least a portion of a transmitted or received physical layer protocol data unit (PPDU), when performing the beamforming training.

5. The electronic device of claim 1, wherein the instructions cause the processor to:
trigger the repeated performing of the beamforming training, when the state of the reference object is changed to at least a preset first threshold value.

6. The electronic device of claim 1, wherein the beamforming training includes:
at least one of a sector sweep (SSW) step or a beam refinement protocol (BRP) step.

7. The electronic device of claim 6, wherein the instructions cause the processor to:
perform the BRP step without performing the SSW step, when the state of the reference object is changed to less than one of a first preset threshold value and a second preset threshold value, upon repeated performing of the beamforming training.

8. The electronic device of claim 1, wherein the instructions cause the processor to:
set an object, which is positioned furthest away from the electronic device, of the at least one object detected, as the reference object.

9. The electronic device of claim 1, wherein the instructions cause the processor to:
detect movement of each of the at least one object, and
set as the reference object the most stationary object of the at least one object detected.

10. The electronic device of claim 1, wherein the instructions cause the processor to:
set a beamforming cycle based on a result of the monitoring.

11. A method for controlling beamforming of an electronic device, the method comprising:
performing beamforming training utilizing a communication module;
transmitting or receiving through the communication module a radio signal for a radar function in a beam direction determined based on the beamforming training;
detecting at least one object positioned in the determined beam direction based on the radio signal transmitted or received;
setting the at least one object as the reference object;
periodically transmitting or receiving through the communication module the radio signal in a direction of the reference object;
monitoring a state of the reference object, based on the radio signal transmitted or received in the direction of the reference object;
recognizing a number of times in which an object other than the reference object is detected, during periodically transmitting or receiving the radio signal for the radar function for a specific period in the direction of the reference object; and
repeating the performing of the beamforming training, based on a result of the monitoring,
wherein the performing of the beamforming training again includes:
giving priority to a direction except for the direction of the reference object, when the number of times is at least a third threshold value.

12. The method of claim 11, wherein the state of the reference object includes at least one of a direction of the reference object, a distance to the reference object, a speed of travel of the reference object, or a position of the reference object, relative to the electronic device.

13. The method of claim 11, wherein the radio signal includes a Golay sequence.

14. The method of claim 11, wherein the radio signal includes at least a portion of a transmitted or received physical layer protocol data unit (PPDU), when performing the beamforming training.

15. The method of claim 11, wherein repeating the performing of the beamforming training includes:
triggering the repeated performing of the beamforming training, when the state of the reference object is changed to at least a first preset threshold value.

16. The method of claim 11, wherein the beamforming training includes at least one of a sector sweep (SSW) step or a beam refinement protocol (BRP) step, and
wherein the performing of the beamforming includes:
performing the BRP step without performing the SSW step, when the state of the reference object is changed to less than one or a first preset threshold value and a second preset threshold value, during repeated performing of the beamforming training.

17. The method of claim 11, wherein setting of the reference object includes:
setting an object, which is positioned furthest away from the electronic device, of the at least one object detected, as the reference object; or
setting the most stationary object of the at least one object as the reference object.

18. The method of claim 11, wherein the repeated performing of the beamforming training includes:
setting a beamforming cycle based on a result of the monitoring.

* * * * *